US008660532B2

(12) United States Patent
Conti et al.

(10) Patent No.: US 8,660,532 B2
(45) Date of Patent: Feb. 25, 2014

(54) USER AUTHENTICATION METHOD FOR ACCESS TO A MOBILE USER TERMINAL AND CORRESPONDING MOBILE USER TERMINAL

(75) Inventors: Mauro Conti, Montecastrilli (IT); Bruno Crispo, Turin (IT); Irina Zachia-Zlatea, Turin (IT)

(73) Assignees: Mauro Conti, Montecastrilli, (TR) (IT); Bruno Crispo, Turin (TO) (IT)

( * ) Notice: Subject to any disclaimer, the term of this patent is extended or adjusted under 35 U.S.C. 154(b) by 57 days.

(21) Appl. No.: 13/337,758

(22) Filed: Dec. 27, 2011

(65) Prior Publication Data

US 2012/0164978 A1     Jun. 28, 2012

(30) Foreign Application Priority Data

Dec. 27, 2010   (IT) ............................. TO2010A1069

(51) Int. Cl.
*H04M 1/66* (2006.01)

(52) U.S. Cl.
USPC ..... 455/411; 455/410; 455/414.1; 455/404.2; 455/456.1; 455/456.2; 455/456.3

(58) Field of Classification Search
USPC ................ 455/410, 411, 414.1, 456.1, 456.3, 455/456.6, 404.2; 713/186
See application file for complete search history.

(56) References Cited

U.S. PATENT DOCUMENTS

2006/0080551 A1*  4/2006 Mantyjarvi et al. .......... 713/186
2008/0175443 A1   7/2008 Kahn et al.
2008/0296393 A1  12/2008 Jovanovski et al.
2009/0083847 A1   3/2009 Fadell et al.
2009/0320123 A1  12/2009 Yu et al.
2010/0192209 A1   7/2010 Steeves et al.

FOREIGN PATENT DOCUMENTS

WO   WO 2006/030065 A1      3/2006
WO   WO 2012083456 A1 *    6/2012

OTHER PUBLICATIONS

Ahmad Akl and Shahrokh Valaee, "Accelerometer-Based Gesture Recognition Via Dynamic-Time Warping, Affinity Propagation, & Compressive Sensing", Acoustics Speech and Signal Processing (ICASSP), 2010 IEEE International Conference on, IEEE, Piscataway, NJ, USA, Mar. 14, 2010, pp. 2270-2273 XP031697817 ISBN 987-1-4244-4295-9.
European Search Report, dated Jul. 12, 2011, for corresponding Italian Patent Application No. TO2010A001069.

(Continued)

*Primary Examiner* — Khalid Shaheed
(74) *Attorney, Agent, or Firm* — Heslin Rothenberg Farley & Mesiti P.C.; Victor A. Cardona, Esq.

(57) ABSTRACT

A user authentication method for access to a mobile user terminal including one or more movement sensor supplying information on movements of the mobile terminal, includes authenticating a user on the basis of a movement performed handling the mobile terminal. A test pattern of values is sensed by one or more movement sensor related to a movement performed in a predetermined condition corresponding to an action for operating the mobile terminal. In a biometric recognition phase the acquired test pattern is compared to a stored pattern of values obtained from the one or more movement sensor by a training phase executed by an accepted user performing the action for operating the mobile terminal. The comparison includes measuring a similarity of the acquired test pattern to stored pattern. An authentication result is obtained by comparing the measured similarity to a threshold.

19 Claims, 11 Drawing Sheets

(56) References Cited

OTHER PUBLICATIONS

P. Senin, Dynamic Time Warping Procedure Review. Technical Report—University of Hawaii at Manoa, 2008.
J. Mantyjarvi, M. Lindholm, E. Vildjiounaite, S.M. Makela, and H. Ailisto, Identifying users of portable devices from gait pattern with accelerometers. 5779(7), 2005 and F. Bergadano, D. Gunetti, and C. Picardi, User authentication through keystroke dynamics, ACM TISSEC, 5(4):367-397, 2002.
J. Liu, L. Zhong, J. Wickramasuriya, and V. Vasudevan, "User evaluation of lightweight user authentication with a single tri-axis accelerometer", in MobileHCI '09, pp. 1-10, 2009.

\* cited by examiner

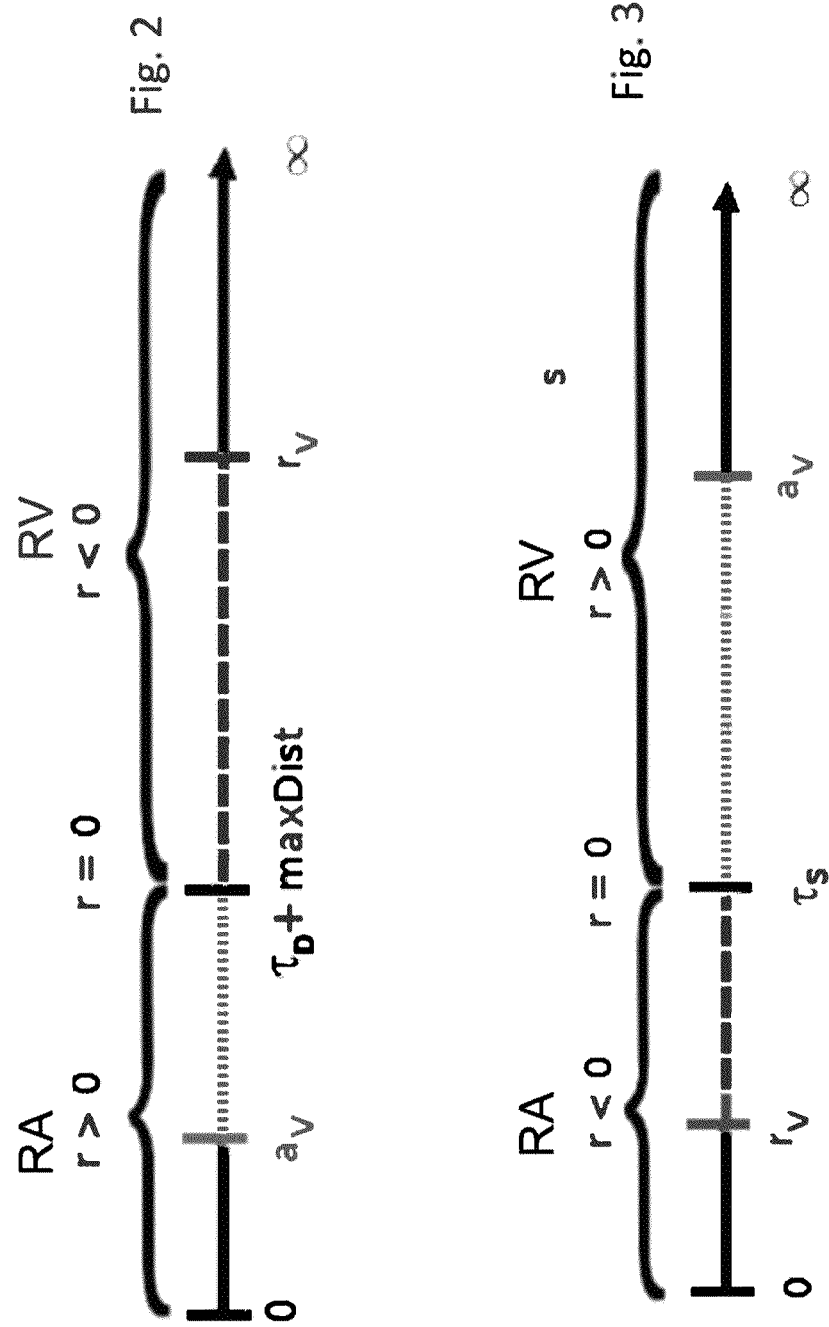

Fig. 12

| $r_A$ | $r_B$ | AND |
|---|---|---|
| 0 | 0 | 0 |
| 0 | 1 | 0 |
| 1 | 0 | 0 |
| 1 | 1 | 1 |

Table 1

| Procedure | $\tau$ | $T$ | IPR | FAR |
|---|---|---|---|---|
| DTW-D-$S_a$ | 0 | 6 | 13.1111 | 23.6666 |
| DTW-S-$S_a$ | 58 | 20 | 12.8888 | 20.6666 |
| DTW-D-$S_o$ | 0 | 20 | 4.444 | 9.3333 |
| DTW-S-$S_o$ | 14 | 20 | 32.0000 | 19.6666 |

Table 2

USER AUTHENTICATION METHOD FOR ACCESS TO A MOBILE USER TERMINAL AND CORRESPONDING MOBILE USER TERMINAL

CROSS-REFERENCE TO RELATED APPLICATIONS

This application claims priority to Italian Patent Application No. TO2010A001069 filed on Dec. 27, 2010, the entire disclosure of which is incorporated herein by reference.

FIELD OF THE INVENTION

This disclosure relates to a user authentication method for access to a mobile user terminal, said mobile user terminal including one or more movement sensor supplying information on movements of said mobile user terminal, said method comprising authenticating a user on the basis of a movement performed handling said mobile user terminal.

This disclosure was devised with specific attention paid to its possible application to mobile user terminal such as mobile phones, in particular smartphones.

For smartphone is here intended a mobile user terminal which is a personal pocket computer with mobile phone functions, which is equipped with one or more movement sensors.

BACKGROUND ART

Mobile user terminals such as smartphones nowadays are very popular. They offer support for an increasing number of applications such as web browsers, e-mail clients, applications for editing documents, taking pictures, and so on. This increase of capabilities and usage creates also the need to improve the security of these devices. However, authentication methods already available for smartphones do not offer sufficient transparency and security.

A transparent authentication method is in general a method not requiring the aware implication of the user to perform an authentication action.

Classical, non transparent, non biometric authentication solutions, like PIN based methods or graphical passwords, have been proposed in the past. However, being non transparent, these methods ask for the aware participation from the user. This can be annoying for the use, in view, for instance, of the continuously prompting for requests. As a result, many users tend to remove such authentication methods. Moreover, classical methods based on PINs or passwords are easy to break, since often predictable passwords are chosen. Similar considerations can be applied to graphical passwords using secret drawings, instead of secret strings of characters. Also in this case users tend to choose symmetric figures which are more predictable and easy to break. Finally, of course, access code can be stolen by a third person by observing, in particular filming with a camera, the user while inputs the secret password or drawing.

Some of the problems of classical authentication methods just described can be solved by biometric authentication methods. In fact, these methods increase the security since the secret information on which are based can not be easily spied and reproduced as they identify the user based on the user's natural features. Biometric measures are classified into two main categories: physiological biometrics and behavioural biometrics. Physiological biometrics identify the user on the basis of the physiological features, such features including face recognition, fingerprint recognition, external ear shape recognition, internal acoustic ear shape recognition (i.e. measuring the shape of the ear channel using acoustic data). The current physiological biometric solutions are affected by one or more of the following problems: non transparent usage; performances are heavily influenced by external factors such as illumination, position or occlusion; lack of required hardware on current mobile terminals.

By way of example, a good recognition rate could be obtained when using external ear shape recognition (recognition rate of some 90%) or internal acoustic ear recognition (Equal Error Rate, EER, of some 5.5%). However, these methods are heavily influenced by external factors, e.g. it is hard to transparently get a useful picture of the ear, or get a useful acoustic feedback that characterizes the internal shape, when the ear might be obstructed by hair, or hats or veils. Also, the camera should be at a distance appropriate to get the correct focus on the target. Such measurements require, in order to properly operate, a specific setup for capturing the image and an active participation of the user, These constraints result in a completely non transparent authentication of the user.

Among physiological biometric measures, methods that do not suffer much by obstruction problems are fingerprint recognition and internal ear recognition. The area that needs to be captured for fingerprint is small, and usually there is no occlusion that may intervene between the user's finger and the scanner. However, this method is not transparent to the user and, most important, it cannot be operated with the technologies commonly available in smartphones. Also, internal ear recognition needs a special device that is placed in the ear to emit acoustic signals and a special microphone needs to be attached to the smartphone.

The other category of biometric measures is behavioural biometrics, where user is identified based on the behavioural features: e.g. keystroke dynamics, voice pattern, or gesture (e.g. the user's walking pattern). However, for these currently implemented methods the recognition process takes a long period of time. For example, in order to recognize the user from the walking pattern, the user is required to walk before the device can figure out whether is the correct user or not. For keystroke dynamics the user has to type a phrase, e.g. up to over 100 characters before recognition can be performed. Similarly, for voice recognition the user has to output some predefined phrases, or sounds, before being authenticated.

Recently, other authentication methods have been proposed which are not biometric but use devices normally present is modern smartphones, such as accelerometers. These mechanisms, such as the one depicted in J. Liu, L. Zhong, J. Wickramasuriya, and V. Vasudevan, "*User evaluation of lightweight user authentication with a single tri-axis accelerometer*", in MobileHCI '09, pages 1-10, 2009, aim at identifying the user based on a secret movement pattern which is measured using data from the accelerometer sensor. The security obtained is high. However also such a movement can be potentially examined by another person and replayed to gain access to the smartphone and its data.

SUMMARY OF THE INVENTION

In view of the foregoing the need is felt for further improved methods capable of providing a transparent authentication based on movement measurement, without requiring a specific setup and using hardware which is commonly available on the user terminal, such authentication being more difficult to intercept than the other movement based authentication solutions.

According to the present invention, such an object is achieved by means of a method having the features set forth in the claims that follow.

The invention also relates to a corresponding mobile user terminal.

The claims are an integral part of the disclosure of the invention provided herein.

BRIEF DESCRIPTION OF THE DRAWINGS

The invention will now be described, by way of example only, with reference to the enclosed views, wherein:

FIG. 2 is a diagram representing data computed by an embodiment of the method according to the invention;

FIG. 3 is a diagram representing data computed by a further embodiment of the method according to the invention;

FIG. 12 shows tables illustrating performance rates of embodiments of the proposed method.

DETAILED DESCRIPTION

Figure 1A:
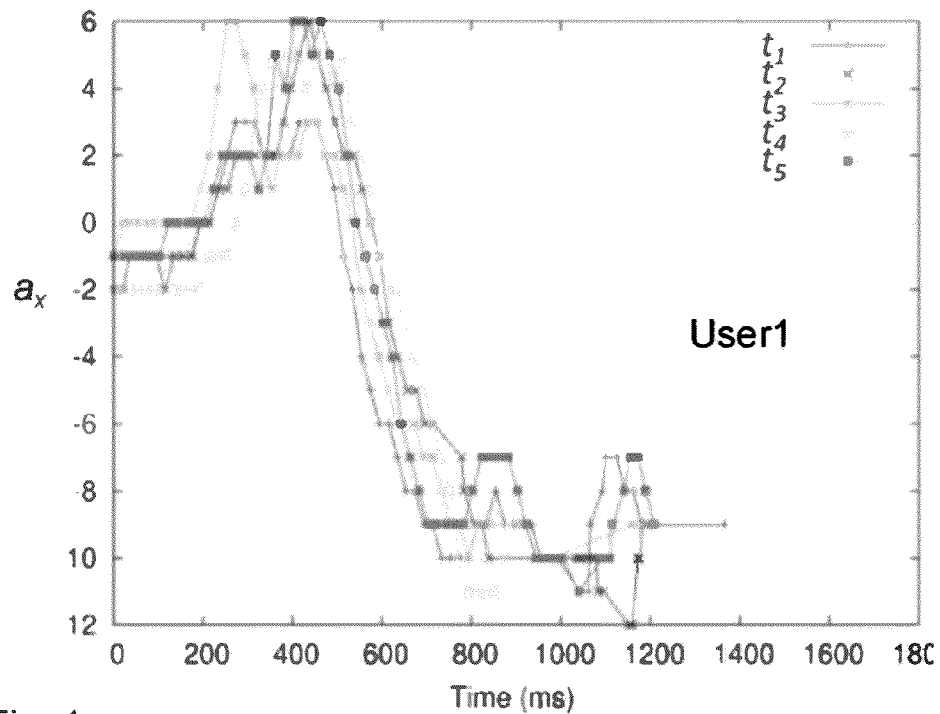
FIGS. 1a and 1b are time diagram representative of training sequences used in the method according to the invention.

In brief the proposed user authentication method for accessing a mobile user terminal, makes use of a mobile terminal, in particular a smartphone, which includes movement sensors, in particular an acceleration sensor and an orientation sensor, supplying information on movements of the mobile terminal, authenticating a user on the basis of a movement performed handling said mobile terminal.

The method envisages in the first place to acquire in a recognition phase the values measured by such sensors which are related to a movement performed in a predetermined condition corresponding to an action for operating said mobile terminal, in particular answering or placing a call.

The values acquired in the measuring phase are compared in a recognition phase to stored values in the terminal obtained from the movement sensors by a training phase executed by an accepted user which performs the same action for operating said mobile terminal selected a predefined condition.

The comparison is performed measuring a similarity between the acquired values and the stored values.

The method according to the invention then obtains an authentication result by comparing the measured similarity to a threshold.

Thus the proposed method substantially makes use of a predefined action to operate the user terminal to operate a biometric measure of the user. The movement pattern performed by a user in a specific condition corresponds to answering (or placing) a phone call. In particular, the considered movement pattern initiates from the moment the user presses "start", to answer an incoming call or to initiate a new one, up to the moment the phone is brought to the ear. Hence, as soon as the phone reaches the ear, the measuring ends and the recognition process starts.

The proposed method, in a preferred embodiment, envisages measuring movement patterns using both the accelerometer sensor and the orientation sensor of a smartphone device.

In a further embodiment, the method according to the invention envisages measuring the similarity of the acquired values to the stored values applying different similarity procedures, in particular different Dynamic Time Warping procedures, separately to each of the values from the acceleration sensor and orientation sensor, in order to obtain a plurality of authentication results.

In a further embodiment, the method according to the invention further provides combining results in such plurality of authentication results with the aim of improving the performance rate, such as improving jointly the values of FAR (False Alarm Rate) rate and IPR (Impostor Pass Rate) rate.

In a further embodiment the method according to the invention envisages combining the results of the different similarity procedures applied to the different sensors by Boolean operations. In a variant is envisaged to combine the results by verifying the number of different procedures accepting a user.

Then, in a further embodiment the method according to the invention envisages normalizing the similarity measurements in the different procedures, in particular calculating averages with respect to the number of training steps executed to acquire the stored values, using then average values to perform said comparison to a threshold in order to authenticate the user. The averaged results are then normalized to the respective threshold values.

In a further embodiment, the method envisages combining the normalized results by a linear combination of two or more of such results in order to improve performance rates.

As mentioned, the proposed method exploits the fact that mobile terminals defined as smartphones are equipped with a wide range of sensors, e.g. to measure acceleration, light, magnetic field, orientation, and temperature. The smartphone also includes an orientation sensor that the proposed method preferably uses in association with the accelerometer sensor. In the following, examples will be made with reference to an implementation on a HTC DEV 1 smartphone using the Android operative system and Java Machine Language. Android implements the OpenGL ES coordinate system which is defined with relation to the screen of the phone, when the phone is in its default position. The default position—either portrait or landscape—depends on the specific smartphone model, e.g. it is portrait for the DEV 1 smartphone here described.

It will be also appreciated, also from what follows, that although the method here described is primarily directed to identify a user performing a certain movement in a predetermined condition corresponding to an action for operating said mobile terminal, by a proper tuning of the parameters, i.e. using higher acceptance thresholds, the method here described is also able to detect simply the execution of the action for operating said mobile selected as predetermined condition, with respect to other actions. For instance, by the proposed method is possible to distinguish a pressure of the call button in order to place a call from an accidental pressure of the call button, e.g. touching accidentally the phone in a pocket or in a bag. This is useful to implement functions of blocking/unblocking of the mobile terminal.

Figures 10, 11:
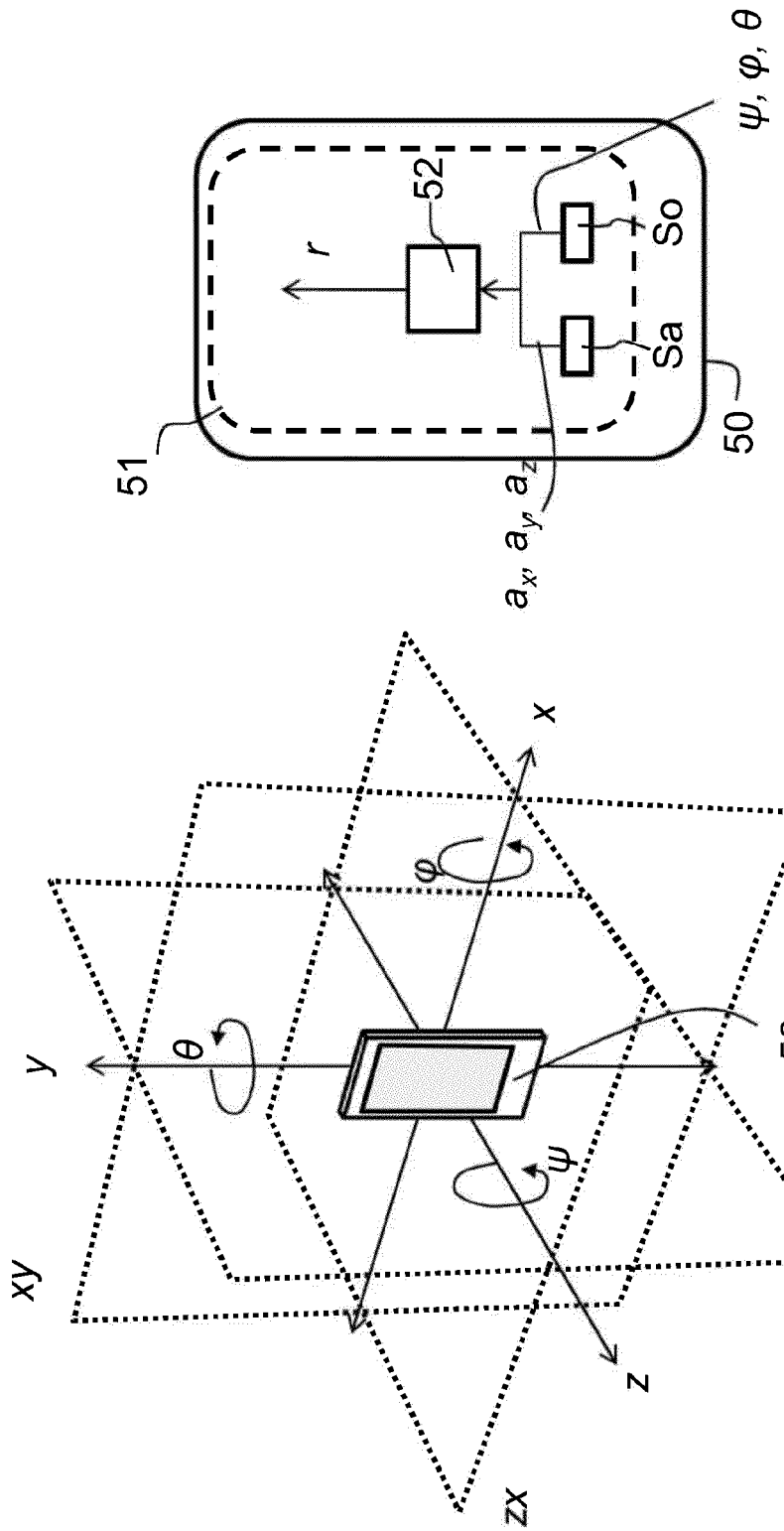
FIG. 10 is a schematic view of a user terminal implementing the method according to the invention.
FIG. 11 is a schematic view of a context of application for the method according to the invention.

In FIG. 10 it is shown schematically, indicated as a whole with the numeric reference 50, a mobile user terminal implementing the method according to the invention. Such user terminal 50 in particular a smartphone, includes a screen 51. The user terminal 50 is equipped with a microprocessor 52, which is for instance the main processor of the smartphone. The user terminal 50 further includes an acceleration sensor $S_a$ and an orientation sensor $S_o$, sending their respective measurement values to the microprocessor 52 for further processing according to software and firmware stored in the microprocessor 50. The microprocessor 52 among other includes a program, i.e. as firmware, as part of the operating system, or as the software component that handles the phone calls, able to implement an authentication method which produces an authentication result r, which determines access or rejection with respect to operating the mobile user terminal 50.

In FIG. 11 it is shown the user terminal 50 and the corresponding axes x, y, z a and associated planes xy, zx, yz.

The origin of the coordinates is given by the lower left corner of a screen 51 of the user terminal 50. The x-axis is horizontal and points right, the y-axis is vertical and points up, and the z-axis points outside the front face of the screen 51.

This coordinate system applies both to an accelerometer sensor $S_a$ and to an orientation sensor $S_o$ in the user terminal 50. Also, these coordinates do not change when the orientation of the phone is changed.

The accelerometer sensor $S_a$ measures the forces applied to the smartphone 50 on the three axis: x, y and z.

The values of the acceleration a of the device on axis x, y and z, are indicated as $a_x$, $a_y$, and $a_z$, respectively.

Preferably, the accelerometer $S_a$ supplies values which correspond to such acceleration values $a_x$, $a_y$, and $a_z$ subtracted of the respective gravity force values, on the axis x, y and z, $g_x$, $g_y$, and $g_z$, respectively.

For instance, when the smartphone 50 is pushed toward the sky with an acceleration a (expressed in m/s$^2$), the acceleration measured by the sensor $S_a$ will be a +9.81 m/s$^2$. This value represents the acceleration of the device: a minus the force of gravity.

The orientation sensor $S_o$ measures values of the angles in degrees of arc, representing the orientation of the smartphone 50 around the three axis x, y, z. For example, assuming a user is standing in a certain position holding the smartphone 50 in one hand, if the user rotates the body, this will mainly imply a modification of the value referring to the rotation around z-axis. Similarly, a rotation around the z-axis is also observed when rotating the device from portrait to landscape.

The angles provided by the orientation sensor $S_o$ are in general of the Euler angles type to define the rotation of a rigid body; in the preferred embodiment here are defined as pitch $\phi$, roll $\theta$, and yaw $\psi$, and are also shown in FIG. 11:

yaw $\psi$ is the rotation around z-axis, yaw (0°≤$\psi$≤360°, 0°=North, 90°=East, 180°=South, 270°=West);

pitch $\phi$ is the rotation around x-axis, pitch (−180°≤$\phi$≤180°, with positive values when z-axis moves toward y-axis);

roll $\theta$ is the rotation around y-axis (−90°≤$\theta$≤90°, with positive values when z-axis moves toward x-axis).

In the Android implementation, by way of example, in the Android API the acceleration sensor $S_a$ is represented using the android.hardware.Sensor class as Sensor.TYPE ACCELEROMETER. The orientation sensor $S_a$ is represented using the android.hardware.Sensor class as Sensor.TYPE ORIENTATION.

The proposed method includes a learning phase in which movements in a predetermined condition of use of the smartphone 50 are recorded through the acceleration and orientation sensors. Such movements recorded in such predetermined condition of use are defined as patterns, and generate, through the sensors $S_a$ and $S_o$, corresponding time series of acceleration and orientation values. The pattern is a time series of sensor data values on the three dimensions and a time coordinate, which is indicated as $t_k$, j being the index of a generical pattern k. During the learning phase a number T of patterns, $t_1, \ldots, t_T$, executed in the predetermined condition of use, is acquired and stored. The proposed method for choosing such predetermined condition for acquiring patterns uses preferably the movement a user performs while answering (or placing) a call might be used as a biometric measure.

The proposed method further includes a recognition phase in which the patterns, i.e. time series of acceleration and orientation values from the sensors $S_a$ and $S_o$, obtained by the operation of the smartphone 50 in such predetermined condition are logged and compared to the stored patterns $t_1, \ldots, t_T$.

The proposed method envisages, for authenticating a user, comparing the patterns originated by the sensors $S_a$ and $S_o$ in the learning phase and in the recognition phase.

Such comparison is performed preferably by a measuring similarity technique, in particular by Dynamic Time Warping (DTW). The DTW procedure, which is known per se, has several versions. Reference is here made, for instance to the procedures described in P. Senin, *Dynamic Time Warping Procedure Review. Technical Report—University of Hawaii at Manoa,* 2008, in particular, the procedure described in Chapter 2 of such publication, which is hereby incorporated by reference.

The DTW procedure is provided for measuring similarity between two sequences which may vary in time or speed in recognition applications. This procedure minimizes the effects of shifting and distortion in time, for time series data. The continuity of the input patterns is less important in the DTW procedure than in other pattern matching procedure such as. Support Vector Machines, Bayesian Networks, and Decision Tree Learning, as it is particularly suited for matching sequences with missing information.

The proposed method makes use of two versions of the DTW procedure, a Dynamic Time Warping procedure with distance feature DTW-D and a Dynamic Time Warping procedure with similarity feature DTW-S. Both these procedures are also known per se and in the software implementation using Android code the corresponding Java functions, from the Java Machine Library can be used.

By way of example a DTW-D procedure applied to two time series, timeseries1 and timeseries2, is based on the following Java code, or an equivalent:

```
DTW dtw=new DTW( );

double measure dtw.getWarpDistBetween
    (timeseries1, timeseries2);
```

A DTW-s procedure applied to two instances, instance1 and instance2 is based on the following Java code, or an equivalent:

```
DTWSimilarity dtw=new DTWSimilarity( );

double similarity=dtw.measure(instance1, instance2);
```

The DTW-D procedure uses as comparison procedure the classical DTW procedure. In the time series, which are as mentioned, a sequence of pairs, each pair represents in general a 3D point (values x, y, and z) and the corresponding time, the time is normalized such that each sequence starts at zero and all the other values represent the time interval passed from the starting point.

The DWT-D procedure when comparing two time series obtains as a result a real value ($\epsilon < \Re +$) which represents a distance measure d. The minimum distance d that can be obtained is zero. Smaller the result, smaller the distance d between the two patterns, higher the similarity. When two identical time series are compared the outputted result is zero.

During the training phase, as mentioned a number T of patterns $t_1, \ldots, t_T$ is obtained forming time series, by acquiring the values at the output of the acceleration sensor $S_a$ and orientation sensor $S_o$ and storing them to in a database. Once the T patterns $t_1, \ldots, t_T$ are added to the database, the corresponding time series are compared one to other by pairs using the DTW procedure, obtaining respective distance values between training patterns. The maximum distance value maxdist obtained in this comparison is stored, and used during the recognition phase. The above is expressed by the relation:

$$\text{maxdist} = \max^T_{i,j=0}\{\text{DTW}(t_i, t_j)\}; \quad (1)$$

where $\text{DTW}(t_i, t_i)$ is the similarity measure computed by the DTW-D procedure between the time series of generic learning patterns $t_i$ and $t_j$.

The calculation of a maximum distance value maxdist has the purpose to make the authentication mechanism being dependent on the specific user's behaviour: instead of choosing a general maximum distance allowed between two patterns, it is considered the maximum distance value maxdist, which is dependent on the training set.

During the recognition phase, a new test pattern $t_x$, given to the system for recognition, is compared to each training pattern $t_1, \ldots, t_T$ in the training set, this resulting in T similarity measures $d_i$, $i=1 \ldots T$, i.e in T distance values $d_i$. If for more than half of these similarity measures are smaller than the maximum distance maxdist plus a given distance threshold $\tau_D$ the test pattern $t_x$ is accepted, the user having performed such test pattern $t_x$ is considered to be the correct one, i.e authenticated, and the access is allowed. The DTW-D procedure yields a result r which is binary, either accepted or rejected, e.g. 1 or 0, true or false. Formally, a user is accepted if the following holds for the test pattern $t_x$:

$$/\{d_i/d_i < \text{maxdist} + \tau_D, i=1 \ldots T\}/ > T/2 \quad (2)$$

$\text{maxdist} + \tau_D$ represents a training dependent threshold, as previously explained.

If equation (2) does not hold, the user is considered an impostor, hence, the access is not granted.

The Dynamic Time Warping Similarity (DTW-S) procedure uses for comparison an adaptation of the classical DTW procedure, which, instead of giving as a result a distance measure, gives as output a percentage of similarity between the two series under comparison. The proposed method uses the DTW-S procedure so that the three axis are considered independently. In particular, the DTW-S procedures uses instances, time series which instead of inputting a three-dimensional point, uses separate series considered independently for each axis. Three instances are thus created, one for each axis x, y and z. When two patterns are compared, the instances corresponding to the same axis are compared. These three results are averaged and the outcome is returned as the final result, that is a similarity percentage value s. Two instances that are identical will give as result 100% of similarity percentage value s. Hence, differently from DTW-D procedure, for DTW-S procedure the higher the result, the higher the similarity between two patterns.

During the training phase a number T of patterns is added to the database. It is underlined that each of the two DTW procedures could give the best output with a different size of the training set. Since the results that can be obtained by this method are bounded both on the lower side (0%) and on the upper side (100%), no processing is performed for the training set. Instead of using a maximum allowed distance maxdist, that is dependent on the training set, for the DTW-S procedure it is only used a maximum accepted threshold $\tau_s$.

During the recognition phase, each new test pattern $t_x$ is compared with each training pattern $t_1, \ldots, t_T$ and the results, i.e. similarity values $s_i$, are averaged. If the average value obtained is greater than a given threshold, the maximum accepted threshold $\tau_s$, the user is considered to be the correct one and the access is guaranteed. On the contrary, if the average is smaller, the user is considered an impostor and the access is denied. Thus also the DTW-s operation yields a result r which is binary, either accepted or rejected, e.g. logic 1 or 0, or true or false The proposed method then, based on the above, envisages to obtain one or more of four basic variant procedures DTW-D-$S_a$, DTW-S-$S_a$, DTW-D-$S_o$ and DTW-S-$S_o$ of the procedure where:

DTW-D-$S_a$ indicates a procedure DTW-D with time series based on data from acceleration sensor $S_a$;

DTW-S-$S_a$ indicates a procedure DTW-S with time series based on data from acceleration sensor $S_a$;

DTW-D-$S_o$ indicates a procedure DTW-D with time series based on data from orientation sensor $S_o$;

DTW-S-$S_o$ indicates a procedure DTW-S with time series based on data from orientation sensor $S_o$.

As mentioned, the proposed method uses as predetermined condition in which acquire the patterns for the biometric authentication measure, the call answering movement that the user performs when answering or placing a phone call. Such condition is preferably based on the assumption that only one user is authorized to answer or place calls. On such a basis, the following two definitions are here given, used in the following as performance rates of the proposed method:

a False Alarm Rate FAR corresponds the percentage of accesses attempted by the authorized user of the system, erroneously rejected;

an Impostor Pass Rate IPR corresponds to the percentage of successful accesses to the system by impostors, pretending to be the authorized users.

Regarding the chosen predetermined condition, the method envisages that when the phone rings first the user handles the phone in front of him to see who is calling, then presses the "start" button to initiate the call. Similarly, when the user places a call, it is assumed that the user handles the phone in front of him to compose the number or search for a name in the contact list, then presses the "start" button to initiate the call. The movement that begins from the instant the user presses "start", until the user handles to phone close to the ear corresponds to a measuring phase in which the data from the sensors $S_a$ and $S_o$ are recorded.

During the training, when the phone reaches the ear, the measuring phase stops and the training data are stored.

During the authentication when the phone reaches the ear the measuring phase stops and the recognition phase starts.

The moment in which the phone reaches the ear can be signaled by a further pressure of a button by the user or by analysing the signal of the sensors, as the phone movements when the phone is at the ear are very small in every direction—under a definable threshold—and the phone is almost completely oriented vertically.

The method, at the onset of such predetermined condition, envisages that the smartphone 50 is configured, as mentioned in the example here detailed by a software application in Java written for the Android operating system, to log the values sensed by the accelerometer sensor $S_a$, i.e. acceleration $a_x$, $a_y$, $a_z$, on x, y, and z axes, and the orientation sensors $S_o$, i.e. pitch $\phi$, roll $\theta$, and yaw $\psi$, while the user moves the phone accordingly to the pattern of the predetermined condition.

In order to verify the method, data were collected by asking 10 users to use the test application to trace data of several movement patterns. For space reasons only part of the results is here given.

Figure 1B:
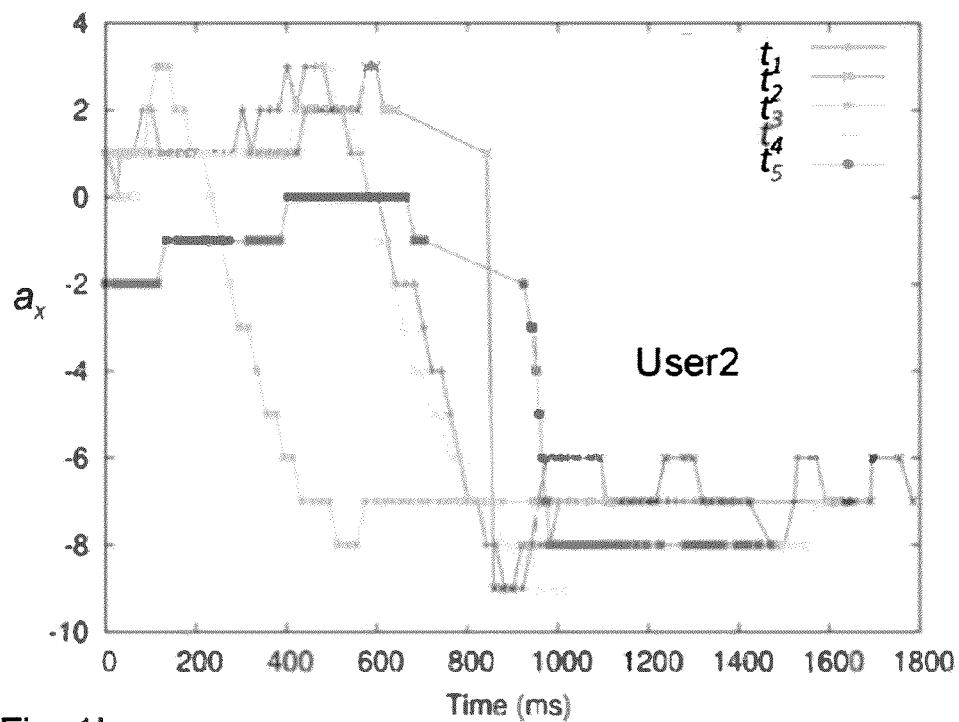

In FIG. 1 it is shown a diagram representing as a function of time expressed in ms the values of the acceleration $a_x$ on the x-axis from the accelerometer sensor $S_a$ obtained with two users, a first user User1 and a second user User2, each one performing the movement according to the predetermined condition five times, respectively patterns $t_1, \ldots, t_5$. FIG. 1a shows the results of the five patterns of User1. FIG. 1b shows the results of the five patterns of User2. The time axis of the diagram starts from the moment the call is initiated.

From FIG. 1a it can be observed that the different patterns of the first user User1 are very close to each other. On the other hand, the patterns of the first user User1 are far from the ones of the second user User2. However, also the patterns of the second user User2 are not close to each other as they are the ones of user User1. A similar behavior has been observed also for other movement patterns, for other users, and for other measured values, not reported in FIG. 1a, i.e. for the other sensor values, such as y and z-axis for the accelerometer sensor $S_a$; pitch, roll, and yaw for the orientation sensor.

The proposed method envisages also operations in order to handle also these differences.

The four different basic procedures DTW-D-$S_a$, DTW-S-$S_a$, DTW-D-$S_o$, DTW-S-$S_o$, considered are the result of all the possible combinations of the considered sensors, accelerometer sensor $S_a$, and orientation sensor $S_o$, and considered similarity procedures, DTW-D and DTW-S.

Both DTW-D and DTW-S procedure need a training phase in which set of T training patterns is stored. Furthermore, the results of these procedures are influenced by the value that is considered as threshold, $\tau_D$ or $\tau_S$, respectively in order to either accept or reject a new test pattern (not in the training set). Thus, it is expected that more users are accepted while having a less strict threshold. Because of the specific procedure, for DTW-D procedure this happens when increasing the distance threshold $\tau_D$, while for DTW-S procedure this happens when decreasing the maximum distance threshold $\tau_S$.

Varying a threshold $\tau_D$ or $\tau_S$ always influences FAR and IPR rate in an opposite way. By way of example, increasing the distance threshold $\tau_D$ in the DTW-D procedure decreases the FAR rate. However, the IPR rate will be increased. Similarly for other variation of parameters: whenever a variation brings a positive influence on one of the performance rates (FAR or IPR rate), the same variation brings a negative influence on the other performance rate.

In order to improve the performance rates, the proposed method envisage applying Boolean operations for combining the results of the four basic procedures DTW-D-$S_a$, DTW-S-$S_a$, DTW-D-$S_o$, DTW-S-$S_o$ in a new combine authentication result. Such Boolean combinations take as input the binary results r of the basic methods, assuming for instance logic one value for the accepted patterns, and logic zero value for rejected patterns. Of course, assignment of logic values to acceptance and rejection can be the opposite.

This mechanism of combination is independent from the specific basic procedures DTW-D-$S_a$, DTW-S-$S_a$, DTW-D-$S_o$, DTW-S-$S_o$ considered as operand. Thus in the following in illustrating the combination techniques reference will be made to the procedures considered as operand of the combinations as a first basic procedure $BR_A$ and a second basic procedure $BP_B$, which represent any pair of basic procedures DTW-D-$S_a$, DTW-S-$S_a$, DTW-D-$S_o$, DTW-S-$S_o$. Similarly, FAR and IPR rates of the first basic procedure $BR_A$ are $FAR_A$ and $IPR_A$, $FAR_B$ and $IPR_B$ for the second basic procedure $BP_B$.

A Boolean operation applied to procedures $BR_A$ and $BP_B$ binary results $r_A$ and $r_B$ is, for instance, logic AND. When combining two basic methods with AND, as indicated in Table 1 shown in FIG. 12, which is substantially a truth table, a test pattern will be accepted only if both procedures accept it, as indicated in the last row of Table 1.

When the first basic procedure $BR_A$ accepts the user, while the second basic procedure $BP_B$ rejects the user, this means that one of the methods has failed: either (i) the user is an impostor and the first basic procedure $BR_A$ is wrong, or (ii) the user is the correct one and the second basic procedure $BP_B$ is wrong. In case (i), the first basic procedure $BP_A$ makes a mistake that would lead to an higher IPR rate value. Hence, taking the AND combination of the results $r_A$ and $r_B$ of the two methods, the second basic procedure $BP_B$ might help to reduce the mistakes of first basic procedure $BR_A$, hence reducing the IPR. In case (ii) it is the opposite, i.e. the second basic procedure $BP_B$ is wrongly rejecting a pattern from the correct user, this leading to an increase of the FAR rate. In this scenario, the AND combination does not allow first basic procedure $BR_A$ to help reduce these type of mistakes of procedure $BP_B$, hence not allowing a reduction of FAR rate. As a general result, considering the cases of Table 1, the AND combination:

can only reduce the IPR rate value. Resulting IPR rate will have $IPR \leq IPR_A$, $IPR \leq IPR_B$. That is:

$$IPR \leq \min\{IPR_A; IPR_B\}: \tag{3}$$

can only increase the FAR rate. Resulting FAR will have $FAR \geq FAR_A$, $FAR \geq FAR_B$. That is:

$$FAR \geq \max\{FAR_A; FAR_B\}: \tag{4}$$

In general, using AND functions the patterns will be accepted only when both methods accept it. In this way, the number of accepted patterns decreases, potentially decreasing the IPR rate value and potentially increasing the FAR rate value.

When using an OR function for combining two basic procedures, the patterns will be accepted even if only one of the methods accepts it. In this way, the number of patterns that get accepted increases, potentially reducing the FAR rate and potentially increasing the IPR rate. Hence, the IPR rate resulting from an OR combination, will have:

$$IPR \leq \min\{IPR_A; IPR_B\} \tag{5}$$

For the FAR value of an OR combination, then, the following equation holds:

$$FAR \geq \max\{FAR_A; FAR_B\} \tag{6}$$

It is possible also to combine together all the four basic procedures DTW-D-$S_a$, DTW-S-$S_a$, DTW-D-$S_o$, DTW-S-$S_o$, instead of just by pairs as described. In this way, the combination mechanism accepts the user based on the number n of basic procedures that accept the user. Such number n runs from one to four basic procedures. Less patterns are in general accepted as n increases, hence it follows a decreasing IPR rate, and an increasing FAR rate.

Therefore the combination of the basic procedures DTW-D-$S_a$, DTW-S-$S_a$, DTW-D-$S_o$, DTW-S-$S_o$, with Boolean operations allows to select a different combination of FAR and IPR rate values.

As shown previously, by varying the number T of training patterns and the threshold values is possible to achieve different values of the FAR and IPR rate. This is also possible with Boolean combinations, although with Boolean combinations is not possible to improve both FAR and IPR values at the same time. The best possible scenario expected for Boolean combinations is that, compared to one of the basic procedures, one of the two rates improve, while the other remain the same. The analysis cannot predict the chance to have such cases, since the actual behaviour depends on the specific users patterns, that is it depends on the size of the set being intersections of cases.

Now, a further method for operating combination of results of the basic procedures DTW-D-$S_a$, DTW-S-$S_a$, DTW-D-$S_o$, DTW-S-$S_o$ is illustrated.

Each single basic procedure DTW-D-$S_a$, DTW-S-$S_a$, DTW-D-$S_o$, DTW-S-$S_o$ contains potentially more information, rather than just the respective binary output r. In fact, each of the two similarity procedures DTW-D and DTW-S here used supplies its output based on a similarity measure, which is a value that expresses how close (or how far) lies the new test pattern $t_x$ compared to the T patterns in the training set. While a single procedure can only output a binary value with respect to a corresponding threshold, by combining procedures together, as described below, it is possible to convey more information. In particular, it is envisaged the following. Assuming for example that the result $r_A$ of the first basic procedure $BR_A$ suggests that the new test pattern $t_x$ is very close to the one of the correct user, while the result $r_B$ of the second procedure $BR_A$ suggests that the test pattern $t_x$ does not belong to the correct user just because the similarity goes beyond the threshold for a small value, in this case, it is expected that the likelihood that the first procedure $BR_A$ is making a mistake is significantly higher than the likelihood that the second procedure $BR_A$ is making a mistake. This represents further information, which is however unexploited.

The proposed method thus further envisages variant DTW procedures, described in the following, which exploit additional information contained in the similarity measure, rather than only the binary results r of the basic procedures, to significantly reduce, at the same time, both FAR and IPR rate values.

In a first normalized DTW-D procedure NDTW-D a test pattern is compared with the training dependent threshold maxdist+τD. The DTW-D procedure is modified to have an output that is normalized, in the range of possible distances from the threshold maxdist+τD. In presenting the proposed normalization, reference is made to FIG. 2, in which the horizontal line represents an axis where the possible output distance values $d_i$ lie. The line is lower bounded by 0 for identical patterns. Above the line is indicated the range RA of accepted values, [0, maxdist+τD), and the range RV of rejected values, [maxdist+τD, ∞); $a_v$ and $r_v$ indicate values assigned to an example of accepted and an example of a rejected pattern, respectively, computed according to computing step which will be detailed below; the dotted interval in the range RA indicates the distance between the accepted value $a_v$ and threshold distance maxdist+τD; similarly, the dashed interval in the range RV indicates the distance between the example of a rejected value $r_v$ and the threshold maxdist+τD.

The conventional DTW-D procedure, in its intermediate steps, as described above, computes for the test pattern $t_x$ a distance $d_i$ from each of the T pattern in the training set. Then, these distances $d_i$ are evaluated to decide whether to accept or reject the test pattern. In the present embodiment a further usage of these distances $d_i$ is made.

First, an average AD of the distance values $d_i$ is computed as $(\Sigma^T_{i=1} d_i/T)$.

In case this average distance AD is less equal than the training dependent threshold maxdist+τD the result is considered an accepted value $a_v$; otherwise, the result is considered a rejected value $r_v$. To make the obtained value of average distance AD normalized such value is normalized to a reference interval. It is considered as reference interval the one from 0 to the training dependent threshold maxdist+τD, which is the interval of all possible accepted values.

This normalization is applied either to results falling in the range RA of accepted values or in the range RV of rejected values. Thus, the result r outputted by the normalized procedure NDTW-D is imposed greater, less or equal than o according to the following:

$r>0$, if $(\Sigma^T_{i=1} d_i/T)<(\text{maxdist}+\tau_D)$;

$r<0$, if $(\Sigma^T_{i=1} d_i/T)>(\text{maxdist}+\tau_D)$;

$r=0$ if $(\Sigma^T_{i=1} d_i/T)>(\text{maxdist}+\tau_D)$;  (7)

while a normalized result m is described by the following equation:

$$m=[(\text{maxdist}+\tau D)-(\Sigma^T_{i=1} d_i/T)]/(\text{maxdist}+\tau D) \quad (8)$$

In the same way a normalized DTW-S procedure, NDTW-S, is defined, which differs from the conventional DTW-S mainly in the way users get accepted. In this case, a test pattern $t_x$ is considered to correspond to the authorized user if the result is greater (and not smaller, as for the DTW-D procedure) than a given threshold. Reference is made to FIG. 3 to describe the normalized version of DTW-S procedure. The notation used in FIG. 3 is consistent with the one previously used for FIG. 2. However, the accepted values $a_v$ are now on the right of the maximum accepted threshold $\tau_S$, and the rejected values $r_v$ are on the left of such threshold $\tau_S$.

The normalized result m, for the normalized version of DTW-S, is computed according to the following equation, where $s_i$ is the similarity percentage value:

$$m=[\Sigma^T_{i=1} s_i/T)-\tau_S]/\tau_S \quad (9)$$

The normalized DTW procedure, applied to the data of acceleration sensor $S_a$ and orientation sensor $S_o$, determine thus accordingly four normalized procedures NDTW-D-$S_a$, NDTW-S-$S_a$, NDTW-D-$S_o$ and NDTW-S-$S_o$, each outputting a respective normalized result m.

It is then envisaged to combining the four respective normalized results m of the normalized procedures NDTW-D-$S_a$, NDTW-S-$S_a$, NDTW-D-$S_o$ and NDTW-S-$S_o$.

Since such four normalized results m are no longer just binary, it is possible to exploit a mechanism to combine the results which simply computes the sum of the normalized results m for each normalized procedure, and compare it to a new combined threshold τ'.

If $m_A$ and $m_B$ are the results of two generic normalized procedure, a first normalized procedure $NP_A$, and a second normalized procedure $NP_B$ which can be any pair selected among the normalized procedure NDTW-D-$S_a$, NDTW-S-$S_a$, NDTW-D-$S_o$ and NDTW-S-$S_o$, in the combined method, the user is accepted if the following equation holds:

$$(\alpha m_A+\alpha m_B)\geq\tau' \quad (10)$$

where α and β are adjusting parameters used to regulate the influence of the two normalized procedure chosen on the overall result. If equation (10) is not satisfied, the user is rejected.

More generally, it is possible to combine more than two normalized procedures and, in particular, all the four normalized procedures, operating the sum of results, here indicated as $m_A$, $m_B$, $m_C$ and $m_D$, of all the four methods and compare them again to a respective combined threshold τ', substantially operating a linear combination of the results. The user is accepted if the following equation is satisfied:

$$(\alpha mA + \beta mB + \gamma mC + \delta mD) \geq \tau' \quad (11)$$

where adjusting parameters α, β, γ and δ are used to control the importance given to each method. If equation (11) is not satisfied, the user is rejected.

To evaluate the effectiveness of the proposed method the performances of all the presented basic methods and of the possible combinations were investigated.

As already described an application for Android operating system was provided on the smartphone Android Dev Phone 1 equipped with Android platform version 1.6., to acquire the movement patterns from the accelerometer and orientation sensors. The evaluation used 10 test users (User1, ..., User10), each of them providing 50 movement patterns according to the predetermined condition defined above, using the FAR and IPR performance rates. For computing FAR, or each user the system was trained with the first T patterns out of all 50 patterns. Then, there were given as input to the authentication method the remaining T-50 patterns, hence considered test patterns $t_x$. It was counted the percentage of times the system were not accepting this patterns, hence not granting access to the correct user. Similarly, it was computed IPR rate by using the first T patterns of the first user User1 as training patterns, and the patterns of the other users as test patterns.

Figure 4A:
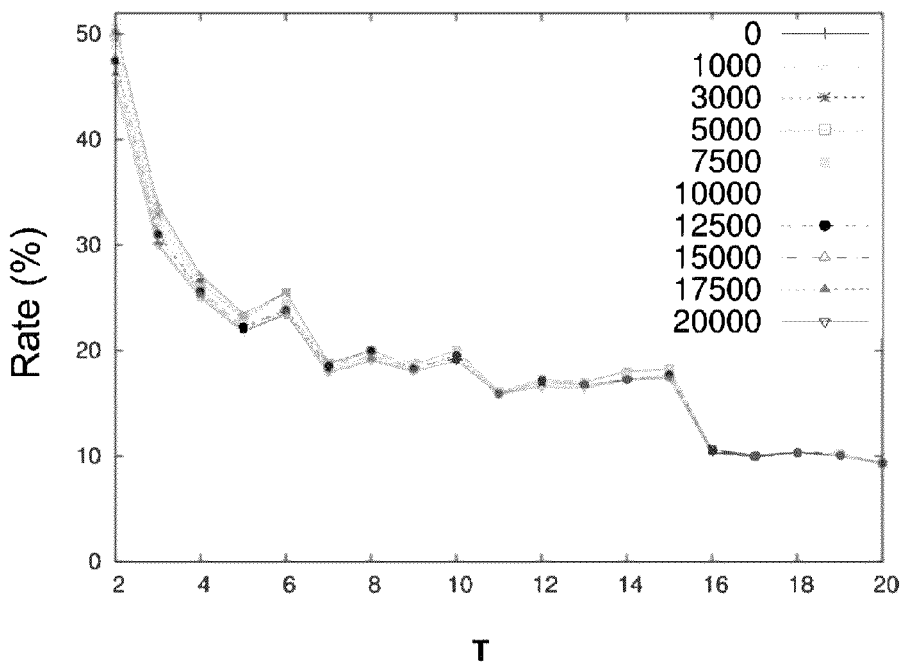
FIGS. 4a, 4b and 5a, 5b are diagrams showing performance rates in function of threshold parameters of embodiments of the method according to the invention.
Figure 4B:
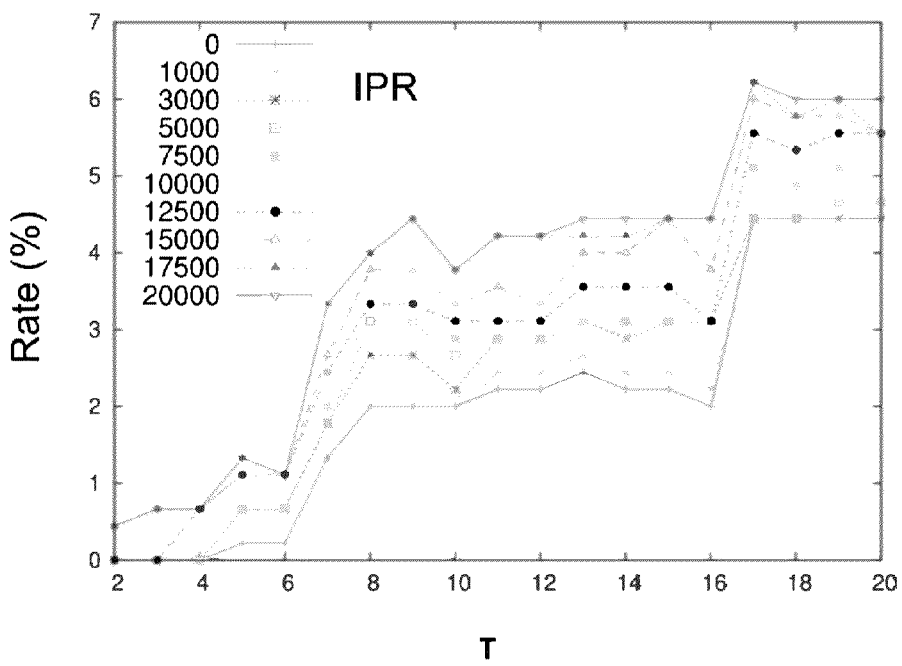
Figure 5A:
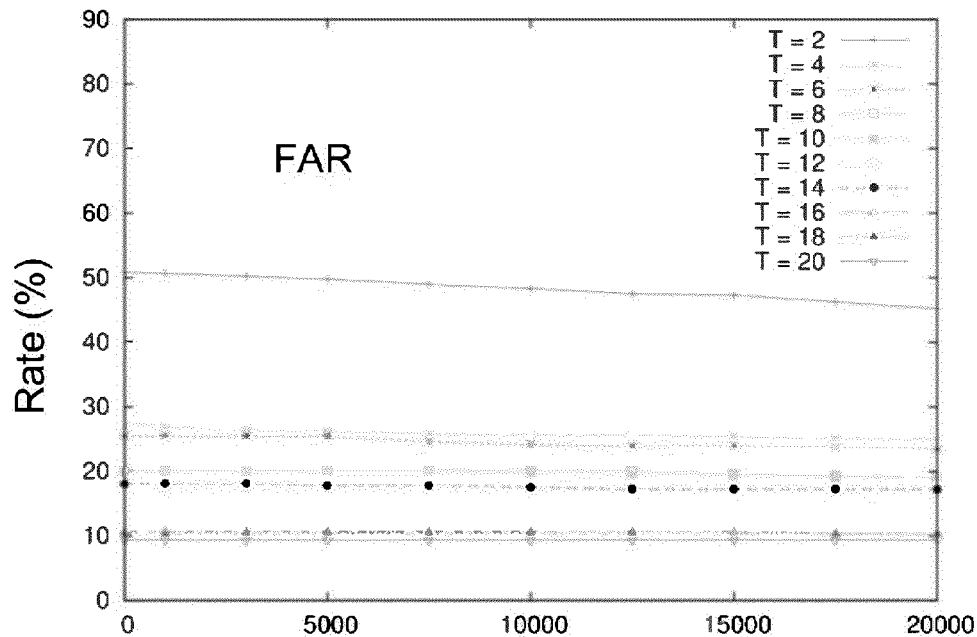
Figure 5B:
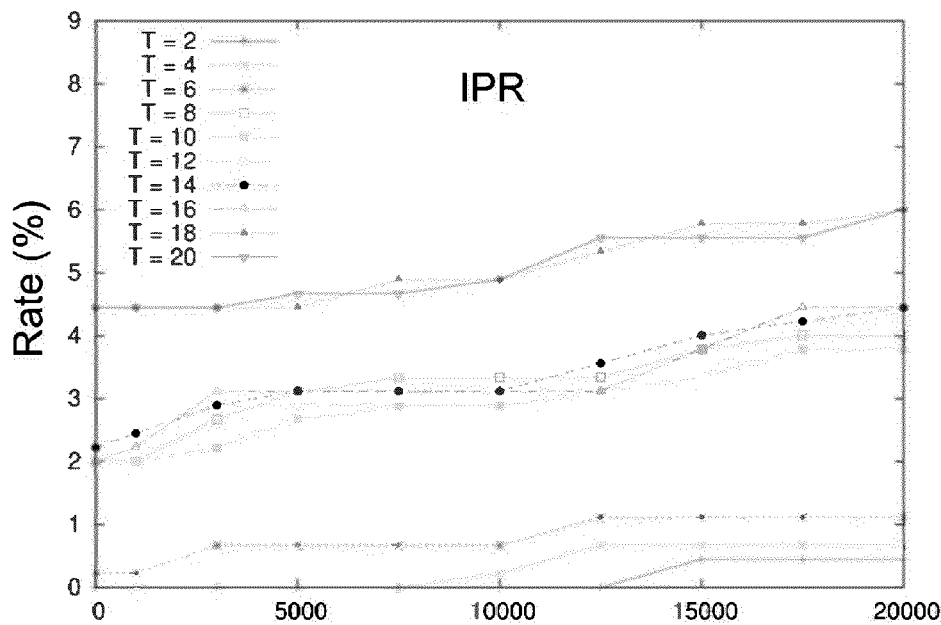
Figure 6:
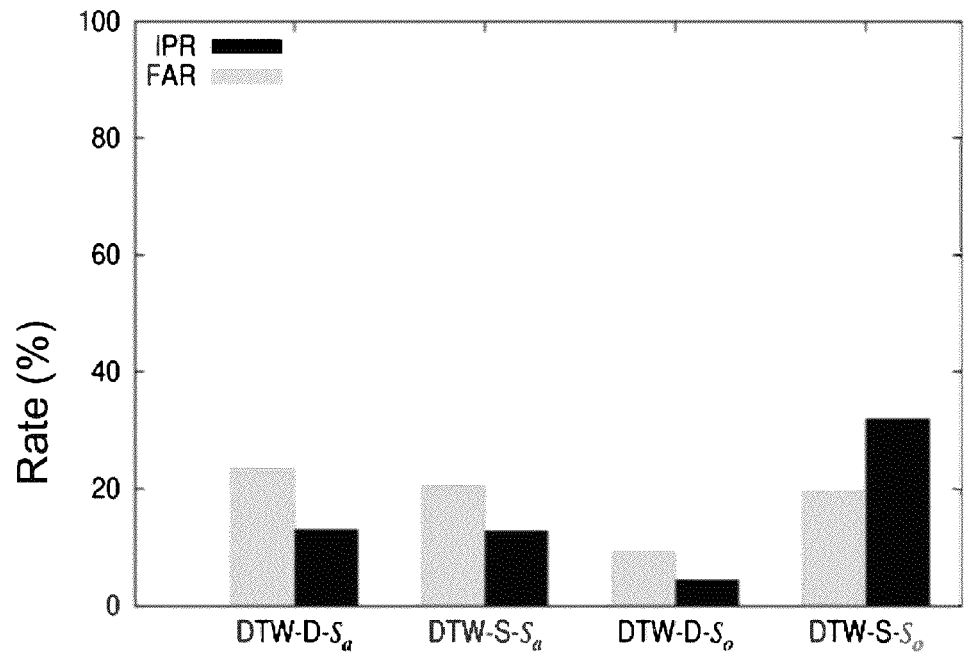
FIG. 6 is a diagram summarizing performance rates of a first set of different embodiments of the method according to the invention.

FIGS. 4, 5 and 6 shows diagram illustrating the rates obtained for the four basic procedures DTW-D-$S_a$, DTW-S-$S_a$, DTW-D-$S_o$, DTW-S-$S_o$. For each of this procedures the number T of training patterns was varied from 2 to 20, and 10 different values for the thresholds were tested. In particular, since the distance procedure DTW-D and similarity procedure DTW-S work in different ways, different set of threshold values were considered. There were considered the following values for the distance threshold $\tau_D$: 0, 1000, 3000, 5000, 7500, 10000, 12500, 15000, 17500, and 20000. Similarly, for the maximum acceptance threshold $\tau_S$, there were considered the following values: 7%, 8%, 9%, 10%, 11%, 12%, 13%, 14%, 15%, and 16%. Experiments were run with all the combinations of these parameters and for each combination, FAR and IPR rates were computed. FIGS. 4 and 5 represent diagram showing how the variation of number T of training patterns and distance threshold $\tau_D$ influences FAR and IPR rates, in the DTW-D-$S_o$ method. FIG. 4 reports the results for different values of distance threshold $\tau_D$, when varying T on the x-axis. In particular, FIG. 4a shows (on y-axis) the corresponding FAR rate, and FIG. 4b the corresponding IPR rate. Similarly, FIG. 5 gives a different view on the same data. It reports the results for the variation of the threshold τS (on the x-axis) for different values of T. In particular, FIG. 5a shows the FAR rate, while FIG. 5b shows the IPR rate. It can be observed from FIG. 4 that an increase in the number T of training patterns decreases the FAR by 30% (from 45%, for T=0, to 15% for T=20), and increases the number of IPR by only 10% (from 0%, for T=0, to less then 10% for T=20). Also, it can be observed that the results for the several considered threshold TS are close to each other. Therefore, within the considered range, the variation of the threshold does not significantly influence the results. This observation can also be drawn from the data in FIG. 5, the curves for different threshold values are almost parallel to the x-axis.

For the other basic procedure DTW-D-$S_a$, DTW-S-$S_a$, and DTW-S-$S_o$, not illustrated here for simplicity, it was observed a similar behaviour. In FIG. 6 are reported some results that summarize the overall performances of all the basic procedures. It is observed that any variation of the number of training T and of the thresholds τ values might improve one of the two FAR and IPR rates, while decreasing the other one. Thus, it is up to the user of the system to prefer to have a smaller FAR (at a cost of an higher IPR), or to have a smaller IPR (at a cost of an higher FAR). In FIG. 6, for each combination of the considered values of the parameters T and τ, it was measured the corresponding FAR and IPR rate. Then, it was computed the average between this two values. For each procedure, it was looked for the parameters setting (number of training and respective thresholds values) giving the smallest average of the two rates.

Also, for each procedure, in Table 2 in FIG. 12 are reported the values of number of training T and generic threshold τ ($\tau_D$ or $\tau_S$) for which it was obtained the lowest average between FAR and IPR rates.

The performances obtained for the basic procedures are comparable to the ones of other prior art transparent authentication methods. In fact, for a single (not combined) procedure, DTW-D-$S_o$ it was obtained IPR ~4.4% and FAR ~9.3%. As an example of performances of concurrent transparent authentication system, gait recognition (i.e. walking pattern) enjoys Equal Error Rate (EER) close to 7%, that is, the performances of walking patterns recognition are similar to the ones of our system. However, while being transparent, walking pattern recognition takes a longer time before the system can detect that the person using the phone is not the correct one. Keystroke dynamic, while obtaining an EER close to zero when performed on computers, it gave for mobile devices an EER=12.8%. Not only this result is high (making this method more insecure), but also the system requires a long time before it collects enough data to take a decision; again, this giving the intruder enough time to access sensitive data.

The prior methods results can be found for instance in J. Mantyjarvi, M. Lindholm, E. Vildjiounaite, S. M. Makela, and H. Ailisto, *Identifying users of portable devices from gait pattern with accelerometers*. 5779(7), 2005 and, F. Bergadano, D. Gunetti, and C. Picardi, *User authentication through keystroke dynamics, ACM TISSEC*, 5(4):367-397, 2002.

Thus, the performances of the basic embodiments of the method according to the invention are comparable or better than the ones of other authentication methods.

Figure 7A:
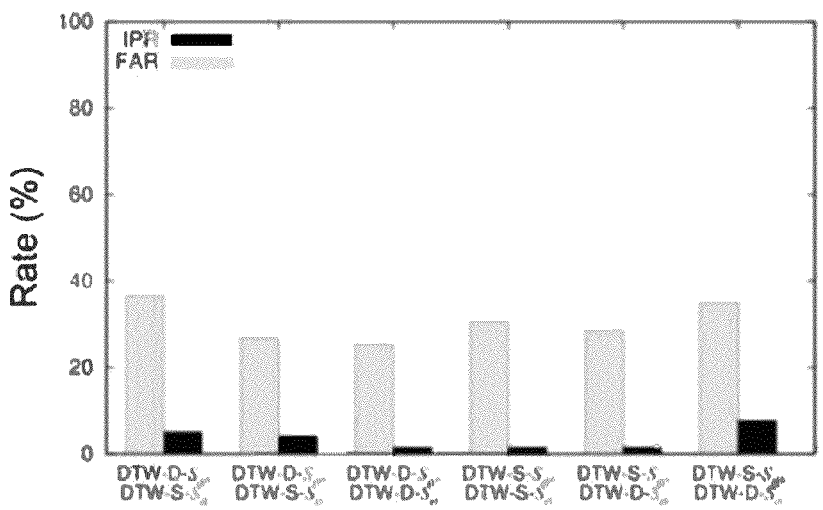
FIGS. 7a-7c are diagrams summarizing performance rates of combinations of said first set of different embodiments of the method according to the invention.
Figure 7B:
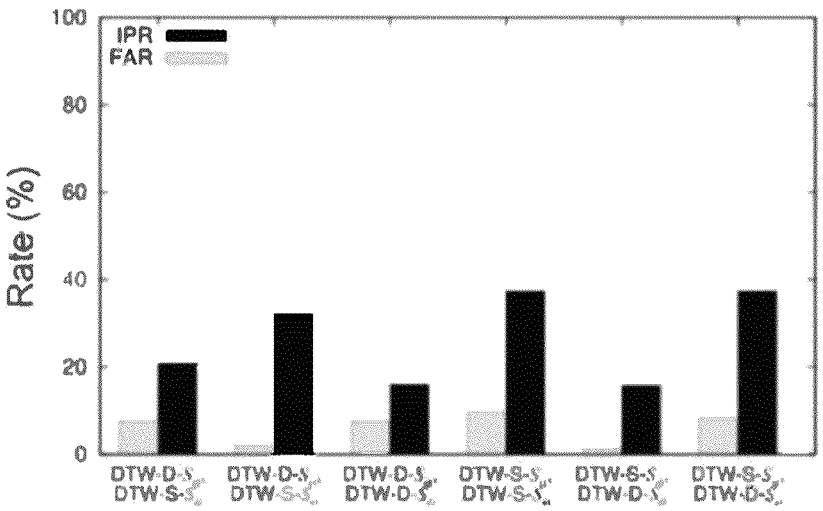

FIG. 7a summarizes the rates obtained for all the possible AND combinations of the results of the basic procedures. As expected, in all the possible combinations of the first and second generic basic procedures, $BP_A$ and $BP_B$, resulting IPR and FAR rate satisfy equation (3) and equation (4), respectively. For the OR combination, results are shown in FIG. 7b, and, as expected, the opposite effect on the combined results is observed. The resulting IPR and FAR behave accordingly to equation (5) and equation (6), respectively.

Figure 7C:
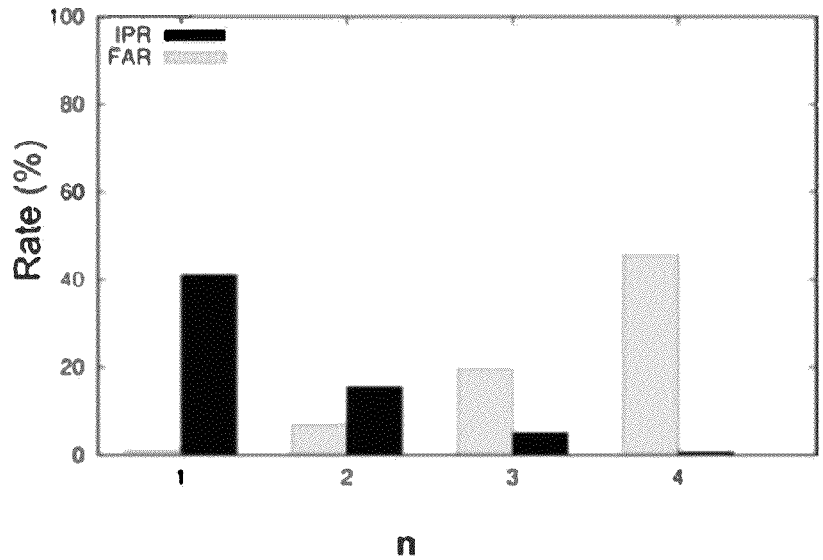

In FIG. 7c are shown rates using the criterion of acceptance of a number n (out of a total four) of basic procedures accepting the user. It can be observed that, as expected, when the number n of procedures considered is increased, fewer users get accepted, thus decreasing IPR rate, while increasing FAR rate.

For what regards the rates obtained by combining normalized procedures, evaluation was performed considering both of the following: (i) combining normalized procedures two by two; (ii) combining all the four normalized procedures together. In case (i), adjusting parameters were $\alpha=\beta=1$ in Equation 10, thus attributing the same relevance to both the procedures. In case (ii), it was set $\alpha=\beta=\gamma=\delta=1$ in equation (11), i.e. each procedure in the combination influences in the same way the overall decision whether the user's pattern should be accepted. For the combined threshold $\tau'$ the values chosen are −0.5, 0.0, 0.5 and 1.0.

Figure 8A:
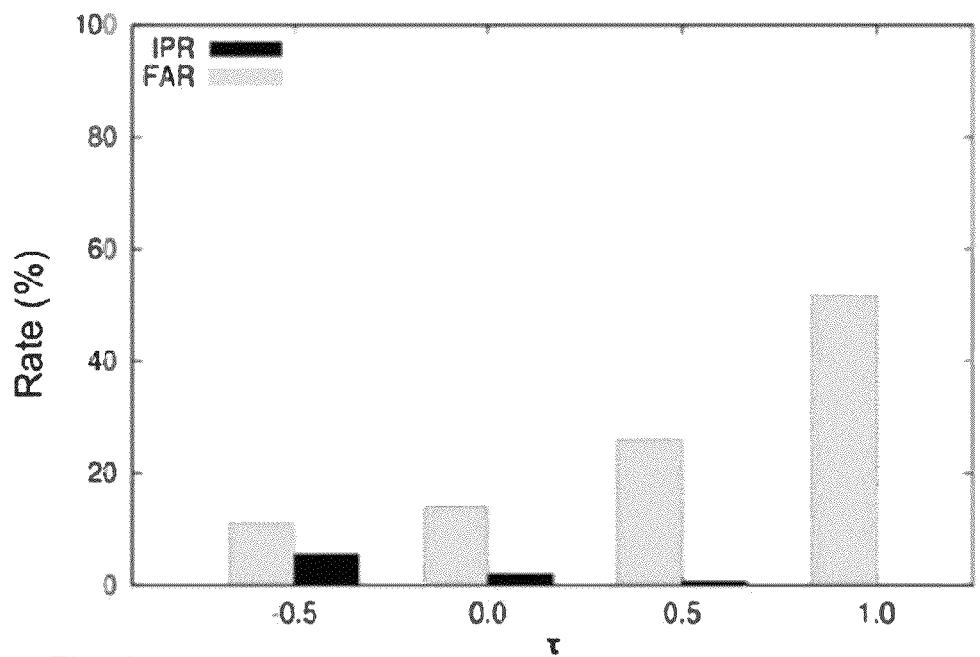
FIGS. 8a-8f are diagrams summarizing performance rates of a second set of different embodiments of the method according to the invention.
Figure 8B:
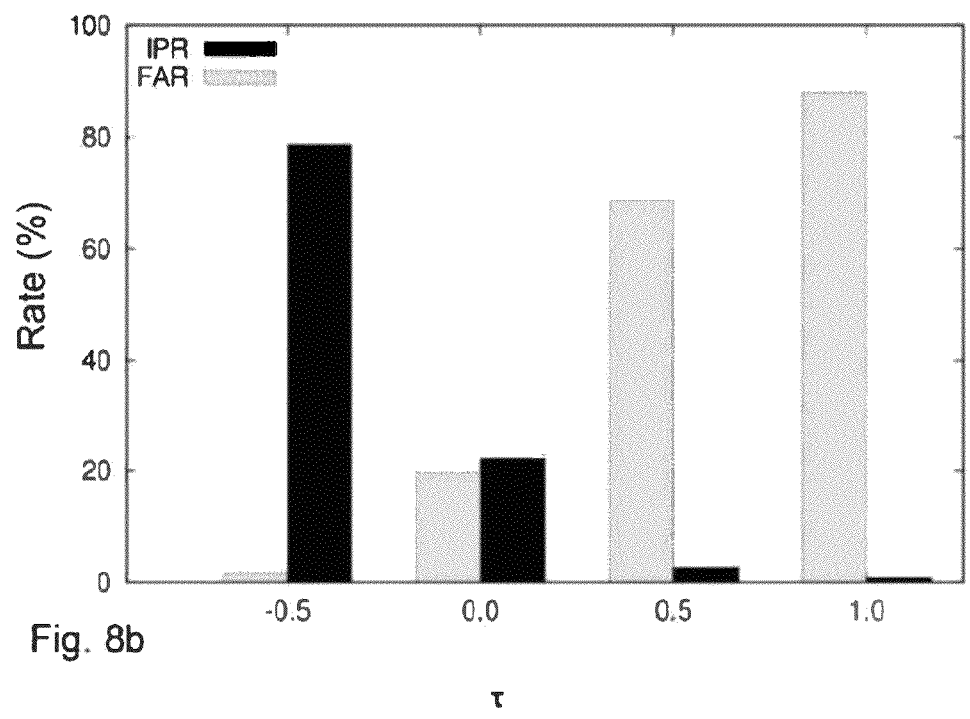
Figure 8C:
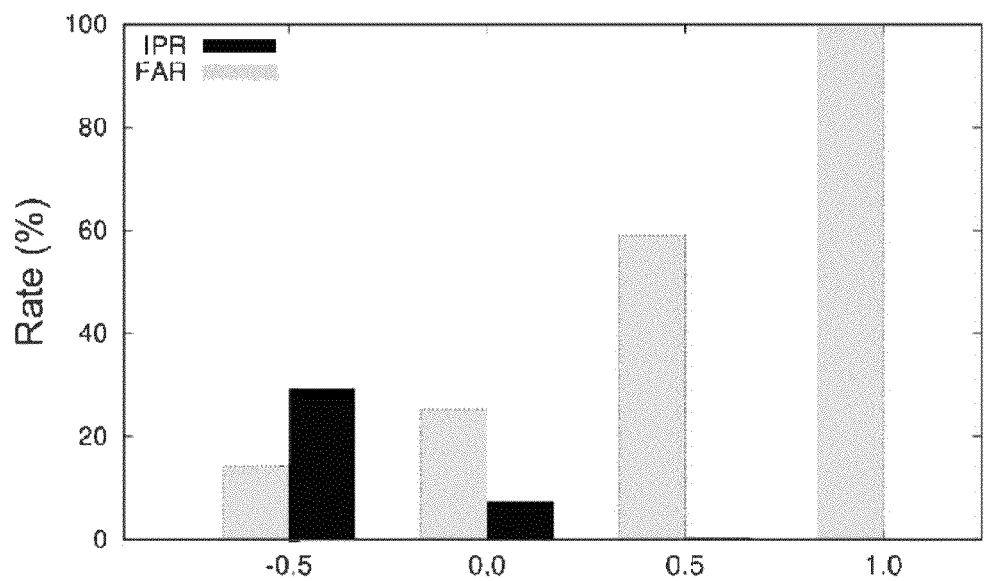
Figure 8D:
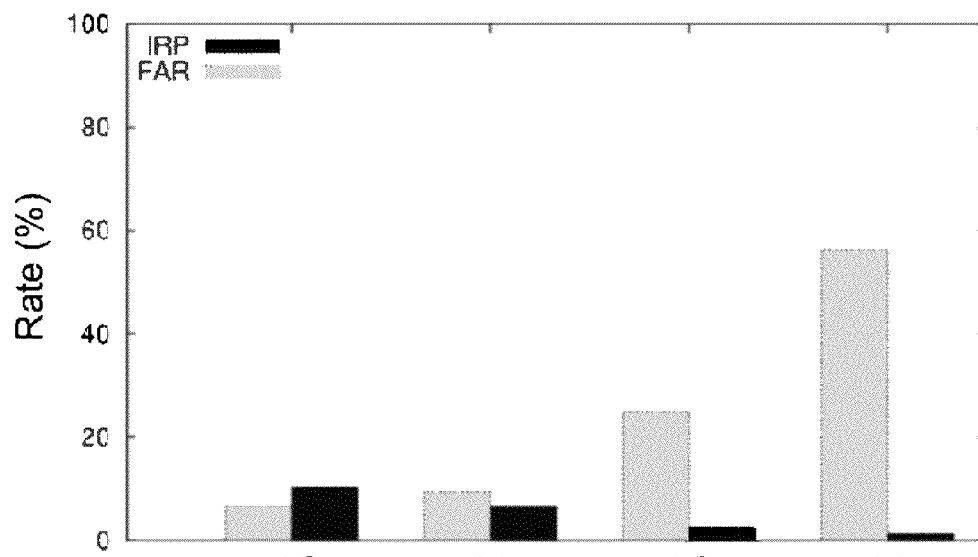
Figure 8F:
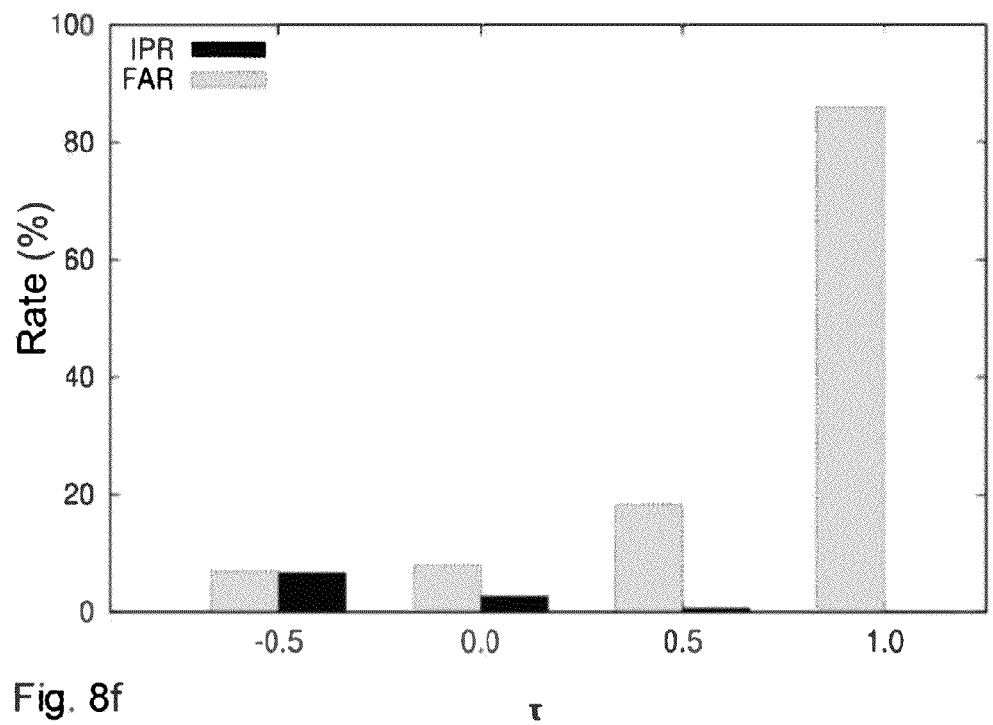
Figure 8E:
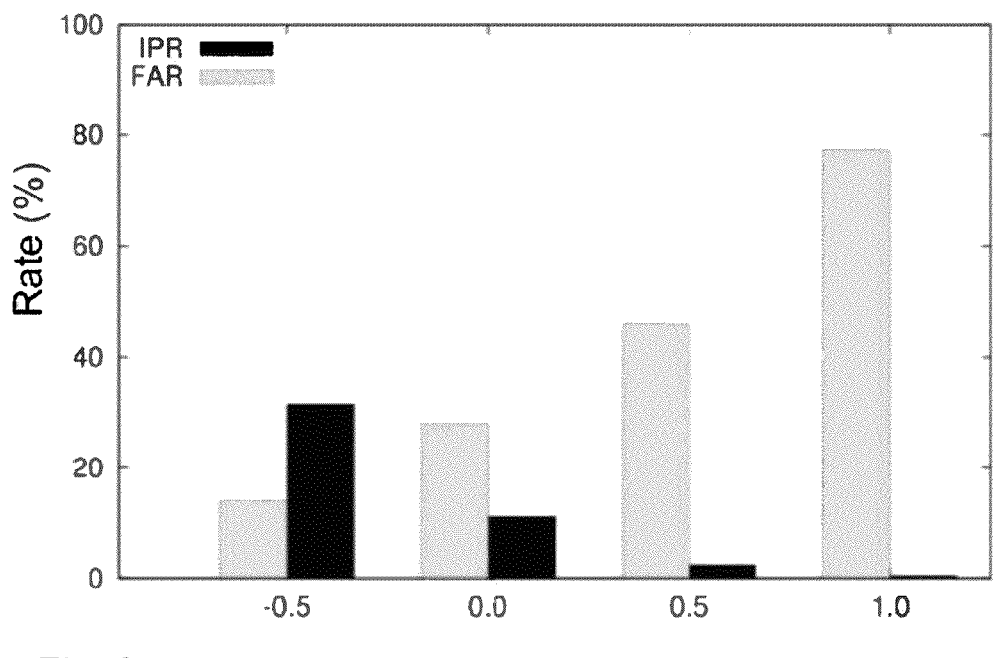

The rates obtained combining two procedures are shown in FIGS. 8a, 8b, 8c, 8d, 8e, and 8f, for all the possible combinations of normalized procedures. Specifically FIG. 8a shows the combination of the results of NDTW-D-$S_a$ and of NDTW-D-$S_o$ procedures, FIG. 8b shows the results of NDTW-S-$S_a$ and of NDTW-S-$S_o$; FIG. 8c shows the results of NDTW-D-$S_a$ and of NDTW-D-$S_a$; FIG. 8d shows the results of NDTW-D-$S_o$ and NDTW-D-$S_a$; FIG. 8e shows the results of NDTW-D-$S_a$, NDTW-S-$S_o$; FIG. 8f shows the results of NDTW-D-$S_o$ and NDTW-S-$S_a$.

Figure 9:
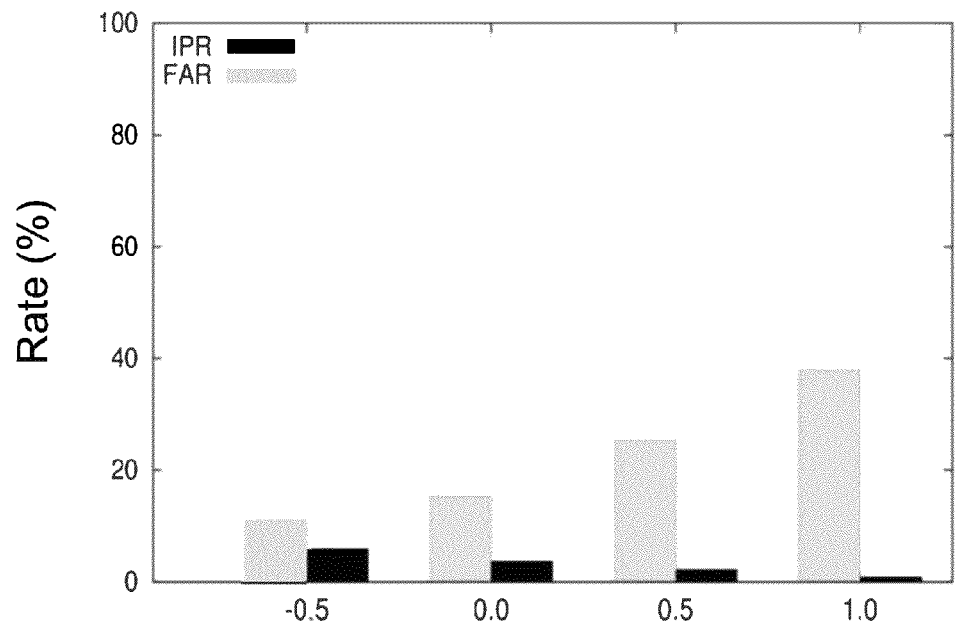
FIG. 9 is a diagram summarizing performance rates of combinations of said second set of different embodiments of the method according to the invention.

The rates of the combination of all the four procedures at the same time are shown in FIG. 9.

From the diagrams of FIGS. 8a-8f, it can be observed that increasing the value of combined threshold $\tau'$ leads to an increased FAR rate and a decreased IPR rate. This observation is consistent for all the considered combinations. This is because increasing the combined threshold $\tau'$ means requiring that the normalized procedures outputs a normalized value m that is closer to the one of the training set. Thus, let alone the influence of the threshold $\tau'$, the method according to the invention by the normalization of DTW-D and DTW-S procedures and their combination is able to significantly improve the results. In fact, using the combination of the normalized procedure results, it was possible to improve both FAR and IPR rates. For instance it was improved from IPR-4.4%, FAR-9.3% obtained for the DTW-D-$S_o$ procedure with the parameters in Table 2, to IPR-2.5%, FAR~8% for a combination of normalized DTW-S-$S_a$ and DTW-D-$S_o$ procedures shown in FIG. 8f with $\tau'=0$, which are obtained with the same T and $\tau$ parameters indicated in Table 2.

For the described combination and parameter setting a value of EER ~7% was observed. Thus, while by only varying the number of trainings T or the value of thresholds $\tau_D$, $\tau_S$ in the basic procedures, or combining such procedure with Boolean operators, is not possible to reduce at the same time both FAR and IPR rate, with the normalized procedures described and their combination, it is possible to reduce the IPR rate of some 50% with respect to the best result observed considering the single procedures, and at the same time also significantly reduce FAR rate.

Thus the advantages of the invention stands clear from the above description.

In the proposed method with respect to methods detecting secret gestures or movements, advantageously it is not possible even observing the movement performed by the user in answering the phone, to replay the movement in a way to obtain authentication, since the method requires replication of the biometric features based on a movement in a predetermined condition, not of the movement per se.

Furthermore, the proposed method while allowing authenticating the user answering a phone call, without requiring a specific interaction for the authentication, thus being transparent, does not suffer from influence of external factors or setup and it is based on devices commonly present in smartphones.

The method according to the invention by obtaining the biometric features in a predetermined condition, which is related to a movement for answering the call, determines a recognition process which is fast an begins substantially before the conversation begins. For instance, in other physiological biometrics methods such as ear recognition methods, the registration of the measure of interest starts when the phone is at the ear, which is indeed the point at which the proposed method finishes authenticating, thus further prolonging the recognition process and delaying the beginning of the actual phone communication.

Without prejudice to the underlying principles of the invention, the details and the embodiments may vary, even appreciably, with respect to what has been described by way of example only, without departing from the scope of the invention as defined by the annexed claims.

The method according to the invention can be applied to user terminals which need authentication to access such as small netbooks, which are different from smartphones, but can be handled by the user in a predetermined condition equivalent to that described above and suitable to product a movement generating a pattern from which biometric information specific of the user can be obtained.

The method according the invention can be implemented as software integrated in the component of the mobile terminal operative system, e.g. Android, that manages the incoming or outgoing calls.

The similarity measurement procedure can be different from the Dynamic Time Warping procedure, e.g. the similarity measurement could be performed by a neural network.

The processing unit configured for performing the steps of the method according to the invention can be a single processor or a plurality of distributed processors.

The invention claimed is:

1. A user authentication method for access to a mobile user terminal, said mobile terminal including one or more movement sensor supplying information on movements of said mobile terminal, said method comprising:
    authenticating a user on the basis of a movement performed handling said mobile terminal;
    acquiring in a measuring phase a test pattern ($t_x$) of values sensed by one or more movement sensor related to a movement performed in a predetermined condition corresponding to an action for operating said mobile terminal;
    comparing in a biometric recognition phase said acquired test pattern to a stored pattern of values obtained from said one or more movement sensor by a training phase executed by an accepted user performing said action for operating said mobile terminal, said comparing including measuring a similarity of said acquired test pattern to said stored pattern;
    obtaining an authentication result by comparing said measured similarity to a threshold; and
    wherein said operation of acquiring a test pattern of values sensed by one or more movement sensor includes acquiring values of information on accelerations sensed by an accelerometer sensor and information on the orientation in space of said mobile user terminal by an orientation sensor to obtain respective time series of accelerations and orientations.

2. The method of claim 1, wherein said measuring a similarity of said acquired test pattern of values to said stored pattern includes applying to said acquired values a Dynamic Time Warping similarity procedure.

3. The method of claim 2, further comprising applying different Dynamic Time Warping procedures separately to each of said information on accelerations and said information on the orientation.

4. The method of claim 3, wherein said applying different Dynamic Time Warping procedures includes applying a Dynamic Time Warping similarity procedure measuring a distance and a Dynamic Time Warping similarity procedure measuring a percentage of similarity to each of said information on accelerations and said information on the orientation to obtain a plurality of respective basic similarity procedures with respective authentication results for each test pattern, in particular four authentication results.

5. The method of claim 4, further comprising performing combination by Boolean operators on pairs of said respective authentication results in order to improve performance rates.

6. The method of claim 4, further comprising considering the outcome of all the results of the basic procedures and authenticating the user if a predetermined number of said basic procedures accepts the user.

7. The method of claim 3, further comprising applying a normalized Dynamic Time Warping similarity procedure measuring a distance and a normalized Dynamic Time Warping similarity procedure measuring a percentage of similarity to each of said information on accelerations and said information on the orientation to obtain respective normalized similarity procedures, said normalized procedures including calculating average values, with respect to a number of training steps executed to acquire said stored patterns, of the distance and percentage of similarity, and using said average values to perform said comparing of said measured similarity to a threshold.

8. The method of claim 7, further comprising obtaining a normalized result by normalizing to a respective threshold said average values.

9. The method of claim 8, further comprising combining said normalized result by a linear combination in order to improve performance rates.

10. A user authentication method for access to a mobile user terminal, said mobile terminal including one or more movement sensor supplying information on movements of said mobile terminal, said method comprising:
authenticating a user on the basis of a movement performed handling said mobile terminal;
acquiring in a measuring phase a test pattern ($t_x$) of values sensed by one or more movement sensor related to a movement performed in a predetermined condition corresponding to an action for operating said mobile terminal;
comparing in a biometric recognition phase said acquired test pattern to a stored pattern of values obtained from said one or more movement sensor by a training hale executed by an accepted user performing said action for operating said mobile terminal, said comparing including measuring a similarity of said acquired test pattern to said stored pattern;
obtaining an authentication result by comparing said measured similarity to a threshold; and
wherein said action corresponds to an action initiating from the moment the user presses a button to answer an incoming phone call or to initiate a new call up to the moment the phone is brought to the ear.

11. A mobile user terminal, said mobile terminal including one or more movement sensor supplying information on movements of said mobile terminal to a processing unit in said mobile terminal, said processing unit being configured for authenticating a user on the basis of a movement performed handling said mobile terminal wherein said processing unit is configured for performing the steps the method according to claim 1.

12. The mobile user terminal of claim 10, wherein the terminal is a smartphone.

13. The method of claim 1 wherein said action corresponds to an action initiating from the moment the user presses a button to answer an incoming phone call or to initiate a new call up to the moment the phone is brought to the ear.

14. The method of claim 2 wherein said action corresponds to an action initiating from the moment the user presses a button to answer an incoming phone call or to initiate a new call up to the moment the phone is brought to the ear.

15. The method of claim 3 wherein said action corresponds to an action initiating from the moment the user presses a button to answer an incoming phone call or to initiate a new call up to the moment the phone is brought to the ear.

16. The method of claim 4 wherein said action corresponds to an action initiating from the moment the user presses a button to answer an incoming phone call or to initiate a new call up to the moment the phone is brought to the ear.

17. The method of claim 5 wherein said action corresponds to an action initiating from the moment the user presses a button to answer an incoming phone call or to initiate a new call up to the moment the phone is brought to the ear.

18. The method of claim 6 wherein said action corresponds to an action initiating from the moment the user presses a button to answer an incoming phone call or to initiate a new call up to the moment the phone is brought to the ear.

19. The method of claim 7 wherein said action corresponds to an action initiating from the moment the user presses a button to answer an incoming phone call or to initiate a new call up to the moment the phone is brought to the ear.

* * * * *

UNITED STATES PATENT AND TRADEMARK OFFICE
CERTIFICATE OF CORRECTION

PATENT NO. : 8,660,532 B2  Page 1 of 1
APPLICATION NO. : 13/337758
DATED : February 25, 2014
INVENTOR(S) : Conti et al.

It is certified that error appears in the above-identified patent and that said Letters Patent is hereby corrected as shown below:

In the Claims:

Column 17, Line 53: Claim 10, Delete "hale" and insert --phase--

Signed and Sealed this
Twenty-seventh Day of May, 2014

Michelle K. Lee
*Deputy Director of the United States Patent and Trademark Office*